United States Patent [19]
Arendt et al.

[11] Patent Number: 4,726,967
[45] Date of Patent: Feb. 23, 1988

[54] LOW TEMPERATURE CONDENSATE ADHERENCE METHOD

[75] Inventors: Paul N. Arendt, Los Alamos, N. Mex.; Michael A. Bayne, Vancouver; Lester M. Finch, Pasco, both of Wash.

[73] Assignee: Jersey Nuclear-Avco Isotopes, Inc., Bellevue, Wash.

[21] Appl. No.: 509,855

[22] Filed: Jun. 30, 1983

[51] Int. Cl.$^4$ .............................................. C23C 16/06
[52] U.S. Cl. .................................... 427/250; 134/16; 134/31; 427/309; 427/319; 427/343
[58] Field of Search .................... 427/248.1, 250, 299, 427/290, 292, 307, 309, 255.3, 349, 377, 271, 55, 319, 343; 134/16, 31; 250/284

[56] References Cited

U.S. PATENT DOCUMENTS 2,956,911 10/1960 Jelen ....................................... 134/31
3,925,079 12/1975 Hager et al. ...................... 427/248.1
4,210,814  7/1980 Clifford ................................ 250/284

OTHER PUBLICATIONS

Severin, "Isotope Separation by Chemical Vapor Deposition and Related Processes", J. of Crystal Growth, 46, pp. 630–636, 1979.
Weed, "Evaporation Boat for Silicon Monoxide", IBM Technical Disclosure Bulletin, pp. 27–28, vol. 2, No. 3, 1959.

Primary Examiner—Sadie L. Childs
Attorney, Agent, or Firm—Weingarten, Schurgin, Gagnebin & Hayes

[57] ABSTRACT

In an isotope separation system in which hot, isotopically separated vapor is deposited on enriched product and depleted tails plates, deposit adherence is improved and plate cooling simplified. The tails plate is liquid-cooled to a lower temperature which permits the product plate to be radiatively cooled by it simplifying product plate cooling and lowering its temperature to reduce the tendency for the product plate deposit to separate during temperature cycling. In one embodiment plate surfaces are cleaned of impurities in a vacuum by allowing the temperature of the tails plates to reach the relatively low operating temperature prior to proceeding with the deposition. In another embodiment plate surfaces are provided with rough surfaces to promote air penetration during deposit stripping, which permits the formation of a brittle, more easily severed bond between plate and deposit. In a further embodiment for the deposition of multiphasic materials, the operating temperature of the tails plate is set to the lowest temperature at which the lower thermal coefficient of expansion phase of the material will adhere to the tails plate.

18 Claims, 3 Drawing Figures

LOW TEMPERATURE CONDENSATE ADHERENCE METHOD

FIELD AND BACKGROUND OF THE INVENTION

In the field of laser isotope separation, a vapor of a material such as uranium having a mixture of isotopes is photoinized and the ionized vapor components are then extracted from the vapor through the use of substrates in the form of tails plates and product plates. These components are separated due to the isotopic selectivity of the process. In normal practice, the tails plates are cooled, whereas the product plates run hot due to the temperature of the condensing deposited material and the extractive ion current. The deposited vapor represents both an enriched and depleted isotope composition. In a practical system the deposition of vapor particles onto the substrates is permitted to continue until a significant quantity of material has been deposited before the subsrates are removed from the process to recover the deposited material. Both the enriched and depleted product are recovered in this manner. As the deposition of material progresses during such isotope separation, the mass of the deposition on the substrate increases which, along with other factors occuring in the process, tends to cause the deposition to flake or fall from the substrate unless good adherence is achieved between the deposited layer and the substrate.

It has been typical in the past to operate the tails paltes at a substantially elevated temperature, for example, at or above 450° C. in order to insure an adequate adherence of the deposition to the substrate. With the tails plates at 450° C., the product plates will run substantially higher. In this regard reference is made to commonly assigned U.S. Pat. No. 4,210,814 of John Clifford, entitled "CONTROL OF PYROPHORICITY IN DEPOSITS PRODUCED BY ELECTRON BEAM EVAPORATION OF URANIUM issued July 1, 1980."

The operation of the collecting substrates at such elevated temperatures is undesirable because the elevated temperature increases the warping tendency of the substrates which must be maintained in precise linear alignment in order to insure the proper operation of a laser isotope separation system. More importantly, when operating at high plate-deposition temperatures, large temperature swings occur at the beginning and end of the process cycle and during unavoidable mid-process shutdowns. These large temperatures swings result in the deposit breaking off the collecting substrates. High operating temperatures for all collecting substrates also result in a high temperature radiative surface for the tails plate. Thus in prior systems the tails plate cannot serve as an efficient heat sink for radiative transfer from the product plates. Poor radiative transfer efficiency necessitates the use of high boiling point fluids as active coolants, and the use of additional cooling pipes or exotic heat pipe technology to remove the large amounts of heat which cannot be completely removed by radiative transfer.

BRIEF SUMMARY OF THE INVENTION

It is a finding of this invention that the vapor deposit will more readily adhere to the various substrates if deposited at lower temperatures, and that certain plate cleaning, contouring, and preheating techniques increase product adherence during deposition and temperature cycling and aid product stripping when exposed to air. The result is that the entire process can be run at lower temperature which dramatically increases adherence in circumstances of thermal cycling by preventing cracking of the deposit during deposition. Running at lower temperatures permits the use of simplified collector plate structures which remove the majority of the product plate heat through radiative heat transfer without costly and complex fluid cooling. This obviates the need for exotic heat removal liquids and heat pipe structures.

In the present invention, radiative transfer to a relatively cold heat sink in the form of the tails plates allows adherent alpha phase uranium deposits to be laid upon the tails plates and side shields, with the tails and side plates being fluidcooled to temperatures controlled in the temperature range of 150° to 170° C. in one embodiment. The ability to use relatively cool surfaces through all the various start-stop procedures of a real production facility allows the use of radiatively cooled main and prestripper product collector plates.

Given the collector plate heat fluxes (heat of condensation of uranium vapor plus the ion current times extraction potential) and a radiative sink maintained at 150° to 170° C., the resultant product plate temperatures are about 450° to 600° C. The latter temperature allows uranium to condense as a solid in the low thermal coefficient of expansion alpha phase as opposed to the higher expansion beta phase. A lower deposition temperature also avoids large thermal changes during cycling between operational and stand-by conditions. These combine to significantly reduce the occurence of product peeling or flaking in actual operation. Note that the deposition of lower thermal coefficient expansion phases of multiphasic materials is applicable to materials other than uranium.

The practical effect is to permit the use of simplified extractor plate structures, avoiding elaborate fluid cooled assemblies.

In accordance with one teaching of the present invention, the surface of the substrate to receive depositions of material from a vapor, and in particular uranium vapor, is preconditioned to improve the adherence of deposited atoms by removing impurity particles at the surface.

In a preferred embodiment, the surface impurities are removed by a preheating of the substrate to a selected temperature for a selected time which tends to induce vaporization of the impurity particles. The preheat temperature is typically a small fraction of the substrate operating temperature previously required to produce adherence. According to this invention, preheat temperatures are within the range of 150°–170° C., and the preheat duration can range from 15 minutes to 4 hours. After the preheating step, the tails substrate is maintained at least at this temperature, typically only slightly higher if at all, during the vaporization and isotopically selective photoionization phase of uranium isotope enrichment. The product plates range significantly higher in temperature as described above. Throughout this period the environment of the substrates is maintained in a high vacuum condition, such as at least $10^{-4}$Torr.

Prior to installation of the substrates within a uranium enrichment chamber, they may also be sandblasted, washed and dried. The purpose of sandblasting is to provide a contoured rough substrate surface. Because the uranium vapor usually arrives at a surface from one direction, it tends to adhere to the "peaks" and does not reach the "valleys." This creates a network of microscopic voids, caverns or tunnels between the condensate and substrate. When the deposit is introduced into a normal atmosphere, oxygen molecules travel down the caverns, attaching to the uranium atoms which turns the interface into a brittle interface that is easy to break, causing separation of the uranium deposit from the substrate. Thus the sandblasting aids deposit release after deposition. Washing and drying is preferably performed to remove dust caused by the sandblasting process. Chemical dissolution techniques may also be employed.

BRIEF DESCRIPTION OF THE DRAWING

These and other features of the present invention are more fully described below in the solely exemplary detailed description and accompanying drawing of which.

DETAILED DESCRIPTION

The present invention contemplates a method and apparatus for vapor deposition and collection at low operating temperatures with simplified collection apparatus. The system is particularly useful in laser isotope separation of uranium, for collecting various isotopically differing deposits of uranium.

Figure 1:
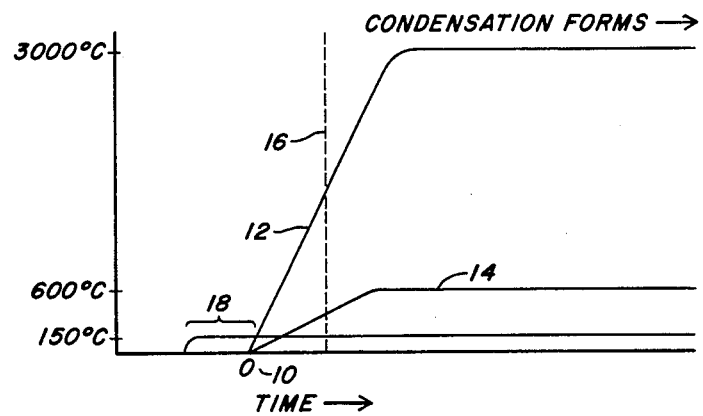
FIG. 1 is a temperature level diagram useful in explaining the operation of the present invention.

With reference to FIG. 1, the principle of the present invention is shown with relation to a system for uranium isotope separation. As currently practiced, a melt of uranium metal is vaporized by a high flux electron beam focused onto a line at the surface of the uranium. The uranium vapor thus generated is directed into a region of aligned, thin electrodes or plates which permit the majority of the vapor to pass but collect certain components of the vapor, typically those which have been or are ionized in the process of vaporization or isotopically selective photoionization. In FIG. 1 from an arbitrary time point 10, designated time 0, the melt is energized and its temperature raises according to a curve 12 to a vaporization temperature point in the vicinity of 3,000° C. Simultaneously with the heating of the melt to produce surface vaporization, tails plates used for extracting ions from the vapor increase in temperature according to a curve 14, typically reaching a temperature of 450° C. At some time 16 in the heating process, vapor will begin to generate and condense upon the structure being heated in accordance with curve 14.

The final steady state tails plates temperature at which the curve 14 stabilizes, typically approximately 450° C., had been previously determined as the lowest temperature at which adherence to tails plates could be achieved. Tails plates are typically fabricated of tungsten or stainless steel.

It has been discovered that operating the tails plates at a relatively low temperature according to a temperature profile represented by curve 17, typically 150° to 170° C., produces adequate deposit adherence, not only to the tails plates, but also to the product plates which can now be limited to operate at a maximum of 600° C. by radiative cooling to the tails plate. At these temperatures, the deposition of uranium is at the alpha phase as opposed to the higher temperature beta phase. The latter phase has a higher thermal coefficient of expansion.

The combination of a lower deposition temperature, which assures a lower temperature difference between stand-by and operating conditions, along with a lower expansion coefficient for the deposit, reduces the cracking and peeling forces that impair adherence.

In a preferrd embodiment, preconditioning comprises substrate preheating for a predetermined time at a selected temperature, is applied to at least the tails plate during an interval 18 in order to clear the substrate surface of impurities which otherwise would impair the low temperature adherence of the deposition. The surface may be preconditioned in other ways including ion bombardment.

The interval 18 typically spans a period of 15 minutes to 4 hours, intervals which have been found satisfactory in operation. In one embodiment, the predetermined temperature during the interval 18 is between 150° to 170° C. and is maintained by elevating the temperature of the fluid used to cool the tails plate to 150° to 170° C. Typical methods of temperature control include passing preheated fluids such as a gas (air, helium, nitrogen) or a liquid (saturated steam, oil, mercury or sodium) through passages in the tails plates especially designed for the purpose.

During the preheat period 18, the vapor source may be turned on to aid in bringing the substrates to the preheat temperature. The source is maintained below the vaporization temperature during this period of time.

At the time point 10, the termination of the preheat interval 18, the vapor source is energized to full vaporization energy with the result that vapor generation commences as its surface temperature increases toward the final steady state temperature level in the region of 3000° C. The temperature of the tails collection structure is controlled so as not to exceed the preheat temperature substantially but also so as not to fall below the preheat temperature of interval 18. The temperature of the tails plate is maintained by a control mechanism acting in a manner known in the art.

With a surface temperature of, for example, 180° C. assured at the tails plate, an effective radiative sink is available to cool the product plates. The latter may be at a temperature of 450°–600° C. since large quantities of heat are transferred to the product plates via metal condensation and extractive ion current, an effective cooling mechanism is needed and is provided by the radiative transfer of the subject system. Assuming a 180° C. (453° K.) tails plate and a 600° C. (873° K.) product plate surface temperature, the driving radiative heat transfer potential is $(873^4 - 453^4)$.

It is essential that the condensates remain intact on the tails and product plates during start-up or termination either at the beginning and end of a process cycle or during an unavoidable process upset. With the subject system, the thermal cycling range is limited by the low operating temperatures to prevent disengagement of condensates.

The low temperature system provides effective radiative cooling of the product plates. Without effective radiative cooling to the relatively cool tails plate, the extractive substrates must include complicated heat transfer structures basically involving cooling tubes or heat pipes, or they must operate at temperatures where the deposits are molten.

Figure 2:
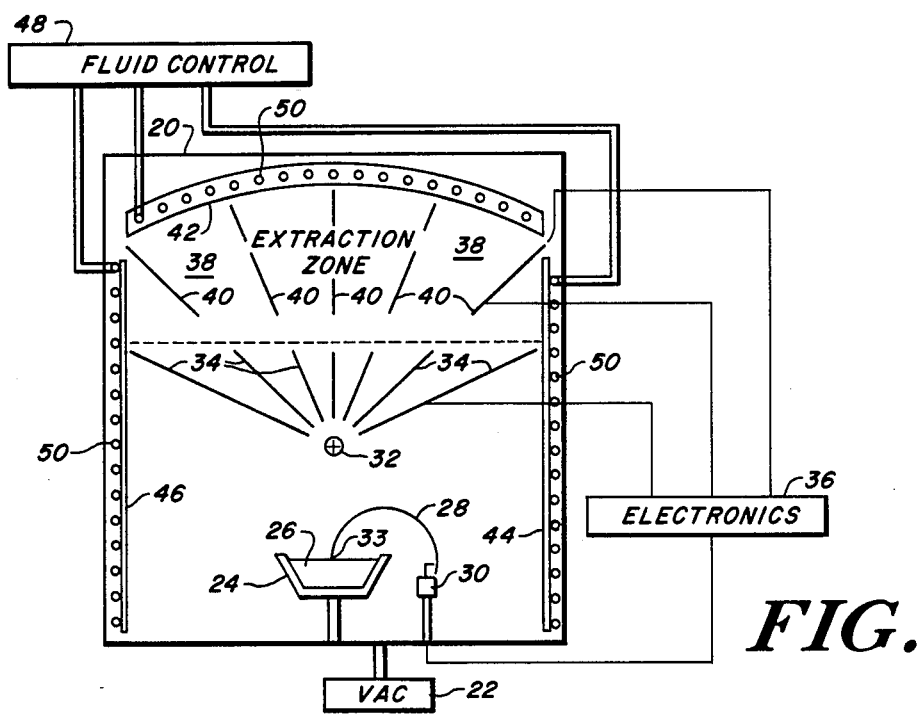
FIG. 2 is a sectional diagram of a typical laser enrichment chamber including the apparatus of the present invention.

Apparatus for practicing the present invention is illustrated in FIG. 2 showing a chamber 20 which is evacuated by a vacuum pump 22 to a very high vacuum condition without oil backflow contamination from the pump. Within the chamber 20, a crucible 24 of uranium 26 is positioned such that an electron beam 28 from a filamentary source 30 can be focused by a magnetic field 32 from coils, not shown, typically surrounding chamber 20. Electron beam 28 is focused to a point 33 on the surface of uranium 26 in a long line running axially in the direction perpendicular to the plane of the drawing thereby forming a melt.

Above crucible 24 is typically arrayed a set of pre-stripper collection plates 34 which are electrically energized by an electronics system 36 to collect preionized particles from the vapor generated from the melt of uranium 26 by electron beam 28. Above electrode plates 34 is an extraction zone 38 containing a set of product plates 40 to which particles ionized with isotopic selectively are attracted. Un-ionized particles continue through extraction zone 38 and are collected on a tails plate 42 as material that is depleted of product material. Other configurations for extraction zone electrodes or plates and preionization extracting electrodes may be utilized, that shown above being a representative scheme as illustrated in the prior art. The plates 34, 40 and 42 may be of any material commonly employed in the art for deposition substrates.

Lining the interior of the chamber 20 are first and second right and left hand baffles or plates 44 and 46 and tails plate 42, all of which are cooled by cooling fluid carried in ports 50 and temperature is regulated by a system 48. By this means, tails plate 42 is cooled to a temperature approximating the lower limit at which vapor depositions will adhere thereto. All plates are subjected to the same preconditioning steps thereby providing excellent thermal bonding of the deposit to the appropriate cooled substrate assuring high thermal conduction from the uranium surface for a good radiative cooling. Importantly, these plates provide a cool surface for radiative cooling of plates 34 and 40. These plates may be further cooled or regulated in temperature by the flow controlled temperature medium, either gaseous or liquid, such as helium, air, nitrogen, saturated steam, oil, mercury or sodium as an auxiliary cooling system of simplified nature.

Figure 3:
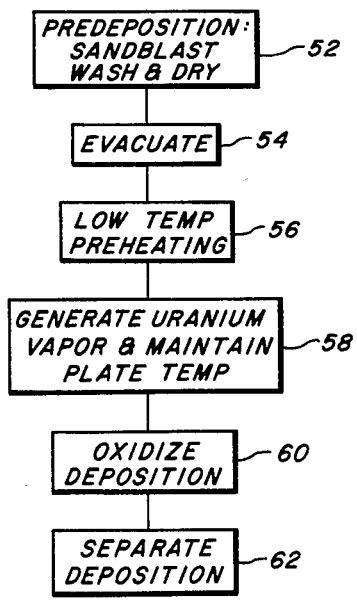
FIG. 3 is a flowchart illustrating the series of steps of the method of the present invention.

The operation of the present invention is illustrated by the flowchart of FIG. 3. FIG. 3 illustrates an optional initial step 52, typically implemented prior to insertion of electrode plates 34, 40 and 42 into chamber 20. The surfaces of these plates are initially partially freed of contaminants by sandblasting, washing and drying. Sandblasting causes the plates 34, 40 and 42 to have contoured rough surfaces, which function as the condensation or deposition substrate, due to the pitting action of the high energy sand particles. This pretreatment also aids in the removal of later deposited material in air as well as increasing adherence of the deposited material in vacuum. Subsequent to this pretreatment step, the plates are installed within the chamber either through vacuum ports or by bringing chamber 22 back to room pressure. Thereafter, in step 54, the chamber is evacuated to a desired low pressure operating point. In step 56, after evacuation, the preheating sequence is initiated for the interval 18. The tails and side plates are driven to the temperature indicated by curve 17 by passing a coolant that is preheated to the proper temperature through passages in the substrate especially designed to accept the coolant to uniformly maintain the substrate at the proper temperature above 150° C., and to maintain the substrates at the appropriate temperature for time interval 18. Typical temperatures and time intervals include, in the case of uranium deposition on stainless steel, a preheat at 170° C. for from 5 minutes to 4 hours to produce an adherent deposition. A preheat at 150° C. for 15 minutes will produce adequate adherence. Lower temperatures wree found not to be effective.

Subsequent to preheating step 56, uranium separation continues for an interval represented by step 58 during which isotopically separated vapor deposits on plates 34, 40, and 42 in accordance with the principles of laser enrichment. Due to the dispostion of the plates 34, 40 and 42 with respect to the metallic vapor stream, the metallic vapor tends to condense or deposit on the raised portions or "peaks" of the contoured rough surfaces thereof, but not on the intended portions or "valleys", thus creating microscopic channels, tunnels or voids between the metallic vapor condensates or deposit and the substrates. During this step, the temperature represented by curve 14 for plates 34 and 40 is maintained principally by radiative cooling to plates 42, 44, and 46.

After a desired accumulation of deposition is achieved, the plates may be removed through vacuum interlocks or by repressurizing chamber 20. The removed plates are exposed to an oxidizing environment in a step 60 which results in their becoming brittle, especially in channels, voids, or tunnels formed by the disparity in the depositions as described above so that separation of the deposit in subsequent step 62, including chemical acceleration of the separation, can occur more rapidly.

The above description is of a preferred embodiment for practicing the concept of the present invention as expressed in the following claims.

What is claimed is:

1. A method for metal vapor deposition in a system having a first set of collection plates in spaced adjacency from a vapor source for a metallic material which vaporizes at a first vaporization temperature and a second set of collection plates in spaced adjacency with said first set of plates and further removed from said vapor source than said first set of plates comprising the steps of:

vaporizing said metallic material at said vapor source at said first vaporization temperature to produce a metal vapor having components thereof;

maintaining said second set of collection plates at a selected second temperature lower than the first vaporization temperature and no lower than the lower temperature limit at which said components of said metal vapor will adhere to said second set of plates to permit adhesion of the vapor components to said second set of collections plates; and cooling the first set of collection plates in spaced adjacency with said second set of plates by permitting the second set of collection plates to function, through radiative heat transfer, as a heat sink for said first set of plates.

2. The method of claim 1, further including a step for increasing the ability to break off deposited material from said plates onto which metal vapor has been deposited, which step comprises providing the substrate onto which metal vapor is deposited with a rough surface.

3. The method of claim 2, including the step of providing said rough surface by a step selected from the group of steps of sandblasting, grinding, or chemical etching.

4. The method of claim 2 wherein said rough surface is washed and dried prior to vapor deposition to promote vapor condensation adherence.

5. The method of claim 1, further including the steps of heating said plates functioning as a heat sink in a vacuum to remove surface impurities for promoting metal vapor condensate adherence.

6. The method of claim 1, wherein said metallic material is uranium, and further including the step of maintaining said heat sink plates between 150° C. and 180° C. whereby said first plates are radiatively cooled to between 450° C. and 600° C.

7. A process for low temperature deposition of metal vapor condensate in a system including a first set of collection plates, a source of metal vapor in spaced adjacency to said first set of collection plates and operative to produce metal vapor particles for deposition upon activation of said vapor source, and at least one second collection plate in spaced adjacency with said first set of collection plates and further removed from said metal vapor source than said first set of collection plates, comprising the steps of:
preheating said at least one second collection plate to a first predetermined temperature for a predetermined time interval prior to activation of said source of metal vapor;
activating said source of metal vapor to produce a vapor comprising metal vapor particles for deposition on said first and second plates;
maintaining said at least one second collection plate at a temperature no lower than said first temperature following activation of said source of metal vapor; and
cooling said first set of plates by radiation of heat energy thereof to said at least one second collection plate to maintain said first set of plates at a predetermined temperature above said first temperature during a period of deposition of metal vapor particles on said first and second plates following activation of said source of metal vapor.

8. The process of claim 7 further including the step of:
evacuating the environment of said substrate prior to said exposing step.

9. The process of claim 7 further including the step of:
predeposition conditioning said substrate.

10. The process of claim 9, wherein said predeposition conditioning step includes a step selected from the steps of sandblasting, mechanical abrasing or chemical etching.

11. The process of claim 9, wherein said predeposition conditioning step includes washing or drying said substrate.

12. A method for facilitating stripping of vapor deposited metallic material from a substrate comprising the steps of:
providing a substrate having a contoured rough surface;
depositing metallic material on said substrate by directing vapors of the metallic material to be deposited toward the substrate surface obliquely to form a deposit thereon and create a network of microscopic channels between the substrate and the deposited metallic material; and
exposing the substrate with deposited metallic material thereon to an environment which penetrates said microscopic channels and interacts with the deposited metallic material at the interface with the substrate to promote separation of the deposited material from said substrate.

13. The method of claim 12, wherein said deposited material is uranium, and said depositing step is carried out on a substrate maintained at a temperature between 150° C. and 600° C.

14. The method of claim 12, wherein said environment includes oxygen.

15. A method for vapor deposition of metallic material in a system having a vapor source for producing a hot metal vapor, a first deposition structure adjacent said vapor source and, a second deposition structure, said first deposition structure being adjacent said second deposition structure and between said vapor source and said second structure comprising the steps of:
depositing components of said hot metal vapor onto said first and second deposition structures;
cooling the second structure to a temperature no lower than the lower temperature limit at which metallic vapor depositions will adhere thereto; and
cooling the first structure by radiative cooling to said second structure adjacent said first structure to a temperature which prevents significant separation of metallic depositions therefrom during temperature cycling.

16. The method of claim 15 wherein:
said metallic material includes uranium; and
said first structure cooling is to a temperature which promotes alpha phase solidification of the uranium vapor deposition.

17. The method of claim 16, wherein said cooling step promotes cooling of said second structure to the range of 150° C. to 180° C. and of said first structure to the range of 450° C. to 600° C.

18. The method of claim 15, further including the step of providing auxiliary fluid cooling of said first structure.

* * * * *